United States Patent Office 3,650,964
Patented Mar. 21, 1972

3,650,964
LOW FOAM ANIONIC ACID SANITIZER
COMPOSITIONS
Ronald M. Sedliar, Trenton, Donald F. Garvin, Berkley, and Otto T. Aepli, Southgate, Mich., assignors to BASF Wyandotte Corporation
No Drawing. Filed May 13, 1968, Ser. No. 728,766
Int. Cl. C11d 3/48, 7/08
U.S. Cl. 252—106     14 Claims

ABSTRACT OF THE DISCLOSURE

Low foam sanitizer compositions are prepared from anionic surfactants or blends thereof in an acid media. The anionic surfactants used in the present invention are those having low foaming characteristics. These anionics are members of the class of sulfonated oleic acids, derivatives of sulfonated oleic acids, alkali metal salts of sulfosuccinic acid esters, and alkali metal salts of alkyl sulfates.

---

The present invention relates to a sanitizing composition. It is more particularly concerned with a composition having improved low foaming properties.

It is well known that numerous anionic surface active agents possess varying degrees of anti-microbial activity. It is also known that the anti-microbial activity may be increased by incorporating such constituents in an acid media. However, these compositions usually possess high foaming characteristics that are undesirable when used in cleaning-in-place (C.I.P.) or spray applications. Typical products commonly used today are based primarily on linear alkyl aryl sulfonic acids in a phosphoric acid media. Many of these products also include iodine. Enough acid is usually included so as to obtain a solution having a pH of 2.8 or less, the range for maximum anti-microbial activity.

It is an object of this invention to provide an improved sanitizer composition. It is an additional object to provide a composition with low foaming properties. It is a further object to provide a composition with anti-microbial activity. Other objects and advantages of this invention will become apparent to those skilled in the art upon consideration of the accompanying disclosure.

The present invention resides in a sanitizer composition. Broadly speaking, the sanitizer composition comprises a particular anionic surface active agent or mixtures thereof and an acid. They may also contain a solubilizing agent and/or a low foaming nonionic surface active agent. More specifically, the sanitizer composition of this invention comprises an anionic surfactant which is a sulfonated unsaturated aliphatic carboxylic acid, a derivative of a sulfonated unsaturated aliphatic carboxylic acid, an alkali metal salt of a sulfosuccinic acid ester, an alkali metal salt of an alkyl sulfate, or mixtures thereof and an acid.

It has been found that the above described anionics, when combined with an acid, exhibit unique low foaming properties as well as a high degree of anti-microbial activity. The prior art discloses many sanitizing compositions which have sufficient anti-microbial activity to meet the recommendations of the United States Public Health Service and the requirements of the United States Department of Agriculture. However, no compositions are known that exhibit low foaming properties in the magnitude of the present invention. Also, it has been found that this low foaming property is not in any way detrimental to the anti-microbial activity of the present invention composition, which surpasses all of the recommendations and requirements of the above-mentioned Federal agencies.

In making up a use solution, enough sanitizing composition is added to an aqueous solution so that the pH is 2.8 or less and the effective kill of specified test organisms (*Escherichia coli* and *Staphylococcus aureus*) is 99.999 percent within 30 seconds at 70°–75° F. This will require, under most circumstances, a concentration of from about 200 to 2000 p.p.m. and upwards of acid in the use solution and from about 100 to 400 p.p.m. and upwards of the anionic in the use solution. As stated above, a solubilizing agent and/or a low foaming nonionic may also be used. The concentration of the solubilizing agent, when used, will be from about 100 to 500 p.p.m. and upwards and the nonionic will be from about 10 to 50 p.p.m. and upwards.

The anionic surface active agents which may be employed in the composition of this invention are the sulfonated unsaturated aliphatic carboxylic acids, such as, for example, monosulfonated oleic acid, monosulfonated linoleic acid, monosulfonated crotonic acid, and the like; the derivatives of sulfonated unsaturated aliphatic carboxylic acids, such as, for example, the carboxylic acid esters of oleic acid, the sodium salt of monosulfonated oleic acid, and the like; the alkali metal salts of sulfosuccinic acid esters, such as, for example, the sodium salt of dioctyl sulfosuccinic acid, the sodium salt of dihexyl sulfosuccinic acid, the potassium salt of dihexyl sulfosuccinic acid, and the like; the alkali metal salts of alkyl sulfates, such as, for example, sodium 2-ethyl hexyl sulfate, and the like; and mixtures thereof.

Any acid or combination of acids may be used in the practice of this invention. The only criterion necessary in selecting an acid is to select an acid or blends thereof which will produce a use solution having a final pH of 2.8 or less. These include, for example, strong acids such as, phosphoric acid, hydrochloric acid, hydroxyacetic acid, sulfuric acid, diglycolic acid, lactic acid, acetic acid, sulfamic acid, and the like. Also blends of weaker acids, such as gluconic acid and citric acid may be used in combination with the above strong acids to give the use solution a pH of 2.8 or less. Phosphoric acid has been found to be the preferred acid since in addition to being a strong acid it acts as a buffer against water impurities and provides a physically stable or homogeneous composition both as a concentrate and in use solutions.

The nonionic surface active agents which may be used in the practice of this invention are polyoxyethylene-polyoxypropylene block and heteric copolymers of ethylene oxide, propylene oxide, butylene oxide, styrene oxide, and other alkylene oxides; alkylene oxide adducts of fatty alcohols, fatty acids, fatty amides, fatty amines, alkyl phenols, and thio alcohols; and butadiene dioxides; and mixtures thereof and the like. The preferred nonionics are the commercially available products having low foaming properties.

Solubilizing agents which may be used in the practice of this invention are those which exhibit the property of increasing the aqueous solubility of organic constituents which in themselves are only slightly water soluble at certain temperatures. Thus, the solubility of the anionics decreases as the temperature is lowered while the solubility of the nonionics decreases as the temperature is raised. The solubilizing agents, therefore, aid in the prevention of physical separation over a wide temperature range and serve to raise the haze or cloud point of the concentrate with a subsequent increase in the shelf life stability of the liquid formulation at temperatures ranging from about 32° F. to about 120° F. And lastly, they should not have any effect on the sanitizing and low foaming properties of the concentrate. It has been found that aliphatic alcohols demonstrate these properties when added to the concentrate of the present invention. Examples of these alcohols include ethanol, propanol, butanol, ethylene glycol, propylene glycol, glycerol, and the like, and mixtures thereof.

In preparing the concentrated sanitizer composition, the ingredients are combined in approximately the following proportions:

| | Parts by wt. |
|---|---|
| Acid | 12–60 |
| Anionic | 3–15 |
| Nonionic | 0–5 |
| Solubilizing agent | 0–15 |
| Water | 85–10 |
| | 100 |

The composition can be readily prepared by mixing the ingredients in the desired proportions. In a preferred method, the composition is prepared in the following manner:

(a) adding with mixing to water at a temperature between 75° F. and 95° F., a solubilizing agent or mixtures thereof, if desired;
(b) adding an anionic surface active agent or mixtures thereof;
(c) adding an acid or mixtures thereof; and
(d) adding a nonionic surface active agent or mixtures thereof, if desired.

A more comprehensive understanding of the invention can be obtained by considering the following examples. However, it should be understood that the examples are not intended to be unduly liimtative of the invention.

EXAMPLE I

This example illustrates that the anti-microbial effectiveness of the present invention surpasses the recommendations of the United States Public Health Service.

The compositions of the sanitizers of the present invention which were used were as follows:

A

| | Parts by wt. |
|---|---|
| Water | 55 |
| Sul-Fon-Ate OA–5 [1] | 5 |
| $H_3PO_4$—75% | 40 |
| | 100 |

B

| | Parts by wt. |
|---|---|
| Water | 42.5 |
| Propylene glycol | 10.0 |
| Monawet MM–80 [2] | 7.5 |
| $H_3PO_4$—75% | 40.0 |
| | 100.0 |

C

| | Parts by wt. |
|---|---|
| Water | 50.5 |
| Sul-Fon-Ate OA–5 [1] | 6.0 |
| Tergitol 08 [4] | 3.0 |
| $H_3PO_4$—75% | 40.0 |
| Pluronic L–61 [5] | 0.5 |
| | 100.0 |

D

| | Parts by wt. |
|---|---|
| Water | 52.0 |
| $H_3PO_4$—75% | 40.0 |
| Monawet MM–80 [2] | 4.5 |
| Tergitol 08 [4] | 3.0 |
| Monawet MO–70E [3] | 0.5 |
| | 100.0 |

Footnotes at end of table.

E

| | Parts by wt. |
|---|---|
| Water | 49.5 |
| Propylene glycol | 2.0 |
| Tergitol 08 [4] | 2.0 |
| Monawet MM–80 [2] | 6.5 |
| $H_3PO_4$—75% | 40.0 |
| | 100.0 |

F

| | Parts by wt. |
|---|---|
| Water | 48.0 |
| Sul-Fon-Ate OA–5 [1] | 3.0 |
| Tergitol 08 [4] | 5.0 |
| Monawet MM–80 [2] | 4.0 |
| $H_3PO_4$—75% | 40.0 |
| | 100.0 |

G

| | Parts by wt. |
|---|---|
| Water | 68.5 |
| Propylene glycol | 5.0 |
| Sul-Fon-Ate OA–5 [1] | 6.0 |
| $H_3PO_4$—75% | 20.0 |
| Pluronic L–61 [5] | 0.5 |
| | 100.0 |

[1] Sul-Fon-Ate OA–5—43.5% sodium salt of sulfonated oleic acid. Commercially available from Tennessee Corporation.
[2] Monawet MM–80—80% dihexyl sodium sulfosuccinic acid. Commercially available from Mono Industries, Inc.
[3] Monawet MM–70E—70% dioctyl sodium sulfosuccinic acid. Commercially available from Mono Industries, Inc.
[4] Tergitol 08–40% sodium 2-ethyl hexyl sulfate. Commercially available from Union Carbide Corp.
[5] Pluronic L–61–polyoxyethylene-polyoxypropylene block copolymer having a molecular weight of about 2,000 and containing about 10% by weight of ethylene oxide. Commercially available from Wyandotte Chemicals Corporation.

In Table I, which follows, there are shown the results of the germicidal and detergent sanitizer tests. The use solution of each sanitizer was prepared by diluting with water until a concentration of 100 or 200 p.p.m. total of anionic surface active agent was achieved. Tests were then run according to the Germicidal and Detergent Sanitizers Test, Methods of Analysis, Association of Official Agricultural Chemists, 10th edition (1965) pp. 87–89, which is the accepted method of the U.S. Department of Agriculture, for determining anti-microbial activity. The criterion recommended by the U.S. Public Health Service, according to the Grade A Pasteurized Milk Ordinance, 1965 Recommendations of the U.S. Public Health Service, Appendix F, p. 131 is "Bactericides which, in recommended concentration, produce a 99.999 percent kill of 75–125 million *Escherichia coli* ATCC 11229 and 75–125 million of *Staphylococcus aureus* ATCC 6538 within 30 seconds at 70°–75° F. should be satisfactory."

TABLE I.—RESULTS OF THE GERMICIDAL AND DETERGENT SANITIZERS TESTS (30 SECOND EXPOSURE)

| | | Test organisms* | | | |
|---|---|---|---|---|---|
| | | *Staphyloccus aureus* | | *Escherichia coli* | |
| Formula | Concentration anionic surface active agent, p.p.m. | Viable count | Percent kill exceeds | Viable count | Percent kill exceeds |
| Sanitizer A | 200 | 10 | 99.999 | 10 | 99.999 |
| | 100 | 10 | 99.999 | 10 | 99.999 |
| Sanitizer B | 200 | 60 | 99.999 | 170 | 99.999 |
| | 100 | 1,000 | 99.999 | 640 | 99.999 |
| Sanitizer C | 200 | 70 | 99.999 | 10 | 99.999 |
| | 100 | 280 | 99.999 | 180 | 99.999 |
| Sanitizer D | 200 | 20 | 99.999 | 10 | 99.999 |
| | 100 | 380 | 99.999 | 90 | 99.999 |
| Sanitizer E | 200 | 80 | 99.999 | 50 | 99.999 |
| | 100 | 910 | 99.999 | 850 | 99.999 |
| Sanitizer F | 200 | 10 | 99.999 | 10 | 99.999 |
| | 100 | 230 | 99.999 | 370 | 99.999 |
| Sanitizer G | 200 | 10 | 99.999 | 10 | 99.999 |
| | 100 | 580 | 99.999 | 120 | 99.999 |

*Numbers of bacterial inoculum 75–125×10⁶ organisms/ml.

As can be seen from the above table, all of the examples had satisfactory anti-microbial activity based upon the recommendations of the U.S. Public Health Service.

EXAMPLE II

This example illustrates the foaming properties of the sanitizer compositions described in Example I as compared with compositions of the prior art.

The compositions of prior art sanitizers used for comparative purposes were as follows:

1

| | Parts by wt. |
|---|---|
| Water | 55.0 |
| Linear alkyl aryl sulfonate | 5.0 |
| 75% phosphoric acid | 40.0 |
| | 100.0 |

2

| | Parts by wt. |
|---|---|
| Water | 45.0 |
| Propylene glycol | 10.0 |
| Linear alkyl aryl sulfonate | 5.0 |
| 75% phosphoric acid | 40.0 |
| | 100.0 |

3

| | Parts by wt. |
|---|---|
| Water | 63.5 |
| Proplene glycol | 10.0 |
| Linear alkyl aryl sulfonate | 6.0 |
| 75% phosphoric acid | 20.0 |
| Pluronic L-61 | 0.5 |
| | 100.0 |

A use solution of each sanitizer was prepared by diluting with water until a concentration of 200 p.p.m. total of anionic surface active agent was achieved. A 50 ml. sample of each solution at 75° F. was placed in a graduated cylinder which was closed tightly with a stopper. The solutions were then shaken for 15 seconds. The cylinders were then allowed to stand at room temperature for one minute, after which the volume of suds of each solution was recorded. The recorded volumes were obtained by reading the difference between the readings at the top of the suds and the top of the liquid levels. These readings were repeated after the solutions had been standing 3 minutes and 5 minutes.

The results obtained in these tests are shown below in Table II.

TABLE II.—COMPARATIVE FOAMING CAPACITY

| Formulation | Foam volume, mls., after— | | |
|---|---|---|---|
| | 1 min. | 3 min. | 5 min. |
| Sanitizer A | 64 | 7 | 2 |
| Sanitizer B | 25 | 11 | 9 |
| Sanitizer C | 80 | 38 | 18 |
| Sanitizer D | 17 | 15 | 15 |
| Sanitizer E | 32 | 10 | 9 |
| Sanitizer F | 88 | 55 | 23 |
| Sanitizer G | 70 | 48 | 16 |
| Sanitizer 1 | 160 | 140 | 135 |
| Sanitizer 2 | 160 | 145 | 135 |
| Sanitizer 3 | 130 | 120 | 115 |

As can be seen from the above table, the foams produced by the sanitizers of the present invention were considerably lower than those produced by similar sanitizers of prior art formulations.

What is claimed is:

1. An acid sanitizing composition consisting essentially of a mixture, based on 100 parts by weight thereof, of:

(a) from about 3 to 15 parts of an anionic surface active agent selected from the group consisting of monosulfonated oleic acid, monosulfonated linoleic acid, monosulfonated crotonic acid, the sodium salt of monosulfonated oleic acid, the sodium salt of dioctyl sulfosuccinic acid, the sodium salt of dihexyl sulfosuccinic acid, the potassium salt of dihexyl sulfosuccinic acid, sodium 2-ethyl hexyl sulfate and mixtures thereof;

(b) about 12 to 60 parts of an acid selected from the group consisting of phosphoric acid, hydrochloric acid, hydroxyacetic acid, sulfuric acid, diglycolic acid, lactic acid, acetic acid, and sulfamic acid; and (c) about 10 to 85 parts of water.

2. The composition of claim 1 wherein the anionic surface active agent is either the sodium salt of sulfonated oleic acid, the sodium salt of dihexyl sulfosuccinic acid, the sodium salt of dioctyl sulfosuccinic acid, sodium 2-ethyl hexyl sulfate or mixtures thereof.

3. The composition of claim 1 wherein the acid is phosphoric acid.

4. The composition of claim 1 wherein the acid has added thereto a blend of gluconic acid and citric acid.

5. The composition of claim 1 which further includes about 0 to 15 parts of a low molecular weight alkanol solubilizing agent.

6. The composition of claim 1 which further includes about 0 to 15 parts of nonionic surface active agent which is a polyoxyethylene-polyoxypropylene block copolymer having a molecular weight of about 2,000 and containing about 10% by weight of ethylene oxide.

7. The composition of claim 1 which further includes:

(a) about 0 to 15 parts of a low molecular weight alkanol solubilizing agent, and (b) about 0 to 15 parts of polyoxyethylene-polyoxypropylene block copolymer having a molecular weight of about 2,000 and containing about 10% by weight of ethylene oxide.

8. The composition of claim 1 wherein the solubilizing agent is propylene glycol.

9. A use solution consisting essentially of the composition of claim 1 and water wherein the acid concentration is from about 200 to 1500 p.p.m. in the use solution and the concentration of the anionic surface active agent is from about 100 to 400 p.p.m. in the use solution.

10. The use solution of claim 9 wherein the acid is phosphoric acid.

11. The use solution of claim 9 wherein the anionic surface active agent is either the sodium salt of sulfonated oleic acid, the sodium salt of dihexyl sulfosuccinic acid, the sodium salt of dioctyl sulfosuccinic acid, sodium 2-ethyl hexyl sulfate or mixtures thereof.

12. The use solution of claim 9 which includes in a concentration of 10 to 500 p.p.m. in the use solution (a) a low molecular weight alkanol solubilizing agent, (b) a nonionic surface active agent which is polyoxyethylene-polyoxypropylene block polymer having a molecular weight of about 2,000 and containing about 10% by weight of ethylene oxide, or (c) mixtures thereof.

13. The use solution of claim 12 wherein the solubilizing agent is propylene glycol.

14. The use solution of claim 9 and having a pH of 2.8 or less.

References Cited

UNITED STATES PATENTS

| 2,593,259 | 4/1952 | Brissey et al. | 252—136 |
| 2,166,476 | 7/1939 | Neilson | 252—143 |
| 2,199,712 | 5/1940 | Neilson | 252—143 |
| 2,338,688 | 1/1944 | Parker et al. | 252—146 X |
| 2,338,689 | 1/1944 | Parker et al. | 252—146 X |
| 2,640,765 | 6/1953 | Easely et al. | 252—142 X |

(Other references on following page)

UNITED STATES PATENTS

| | | | |
|---|---|---|---|
| 2,969,332 | 1/1961 | Lawler et al. | 252—354 |
| 3,218,260 | 11/1965 | Lewandowski | 252—142 |
| 3,271,319 | 9/1966 | Morrison | 252—142 |
| 3,349,037 | 10/1967 | Peterson | 252—146 |

FOREIGN PATENTS

| | | | |
|---|---|---|---|
| 632,321 | 11/1949 | Great Britain | 252—353 |
| 917,432 | 2/1963 | Great Britain | 252—106 |

OTHER REFERENCES

McCutcheon, Detergents and Emulsifiers (1967, J. W. McCutcheon, Inc., p. 243.

LEON D. ROSDOL, Primary Examiner

P. E. WILLIS, Assistant Examiner

U.S. Cl. X.R.

252—107, 143